US011570092B2

(12) United States Patent
Kancherla et al.

(10) Patent No.: US 11,570,092 B2
(45) Date of Patent: Jan. 31, 2023

(54) METHODS FOR ACTIVE-ACTIVE STATEFUL NETWORK SERVICE CLUSTER

(71) Applicant: Nicira, Inc., Palo Alto, CA (US)

(72) Inventors: Mani Kancherla, Cupertino, CA (US); Ronghua Zhang, San Jose, CA (US)

(73) Assignee: NICIRA, INC., Palo Alto, CA (US)

(*) Notice: Subject to any disclaimer, the term of this patent is extended or adjusted under 35 U.S.C. 154(b) by 1071 days.

(21) Appl. No.: 15/665,111

(22) Filed: Jul. 31, 2017

(65) Prior Publication Data

US 2019/0036815 A1 Jan. 31, 2019

(51) Int. Cl.
*G06F 15/173* (2006.01)
*H04L 45/00* (2022.01)
*H04L 41/0806* (2022.01)
*H04L 67/10* (2022.01)
*H04L 45/74* (2022.01)
*H04L 67/142* (2022.01)
*H04L 9/40* (2022.01)

(52) U.S. Cl.
CPC .......... *H04L 45/46* (2013.01); *H04L 41/0806* (2013.01); *H04L 45/74* (2013.01); *H04L 67/10* (2013.01); *H04L 67/142* (2013.01); *H04L 63/0218* (2013.01)

(58) Field of Classification Search
CPC ....... H04L 45/46; H04L 63/00; H04L 67/142; H04L 67/10; H04L 45/74; H04L 41/0806
USPC ......... 709/238, 204–207, 224–228; 370/392, 370/389, 255, 352, 356, 401, 474, 476, 370/230, 310; 726/11, 13, 23; 455/435.1
See application file for complete search history.

(56) References Cited

U.S. PATENT DOCUMENTS

| 5,204,966 A | 4/1993 | Wittenberg et al. |
| 5,900,025 A | 5/1999 | Sollars |
| 6,108,308 A | 8/2000 | Flavin et al. |

(Continued)

FOREIGN PATENT DOCUMENTS

| CN | 101641912 A | 2/2010 |
| CN | 103181131 A | 6/2013 |

(Continued)

OTHER PUBLICATIONS

NPL Author Unknown, "Enabling Service Chaining on Cisco Nexus 1000V Series," Month Unknown, 2012, 25 pages, Cisco.

(Continued)

*Primary Examiner* — Thuong Nguyen
(74) *Attorney, Agent, or Firm* — Adeli LLP

(57) ABSTRACT

For a managed network, some embodiments provide a method for a set of service nodes in an active-active service node cluster in conjunction with a host computer hosting a destination data compute node (DCN) to improve the efficiency of directing a data message to a service node storing state information for the flow to which the data message belongs. a first service node receives a data message in a particular data message flow for which it does not maintain state information. The first service node then identifies a second service node to process the data message and forwards the data message to the second service node. The second service node sends state information for the particular data message flow to the first service node, for the first service node to use to process subsequent data messages in the particular data message flow.

20 Claims, 10 Drawing Sheets

(56) References Cited

U.S. PATENT DOCUMENTS

| | | | |
|---|---|---|---|
| 6,687,245 B2 | 2/2004 | Fangman et al. | |
| 7,120,693 B2 | 10/2006 | Chang et al. | |
| 7,146,421 B2 | 12/2006 | Syvanne | |
| 7,277,401 B2 | 10/2007 | Kyperountas et al. | |
| 7,561,515 B2 | 7/2009 | Ross | |
| 7,724,670 B2 | 5/2010 | Nilakantan et al. | |
| 7,760,640 B2 | 7/2010 | Brown et al. | |
| 7,765,312 B2 | 7/2010 | Monette et al. | |
| 7,778,194 B1 | 8/2010 | Yung | |
| 7,818,452 B2 | 10/2010 | Matthews et al. | |
| 7,826,390 B2 | 11/2010 | Noel et al. | |
| 7,881,215 B1 | 2/2011 | Daigle et al. | |
| 7,948,986 B1 | 5/2011 | Ghosh et al. | |
| 8,005,770 B2 | 8/2011 | Minh et al. | |
| 8,190,767 B1 | 5/2012 | Maufer et al. | |
| 8,261,317 B2 | 9/2012 | Litvin et al. | |
| 8,300,532 B1* | 10/2012 | Venkatramani | H04L 45/38 370/235 |
| 8,316,113 B2 | 11/2012 | Linden et al. | |
| 8,339,994 B2 | 12/2012 | Gnanasekaran et al. | |
| 8,369,323 B1* | 2/2013 | Desai | H04L 67/1034 370/216 |
| 8,370,936 B2 | 2/2013 | Zuk et al. | |
| 8,553,552 B2 | 10/2013 | Hu et al. | |
| 8,625,426 B2 | 1/2014 | Strulo et al. | |
| 8,711,703 B2 | 4/2014 | Allan et al. | |
| 8,713,663 B2* | 4/2014 | An | H04L 63/20 714/4.1 |
| 8,737,221 B1* | 5/2014 | Jilani | H04L 47/2416 370/235 |
| 8,811,401 B2 | 8/2014 | Stroud et al. | |
| 8,830,834 B2 | 9/2014 | Sharma et al. | |
| 8,897,132 B2 | 11/2014 | Feroz et al. | |
| 8,937,865 B1 | 1/2015 | Kumar et al. | |
| 8,942,238 B2 | 1/2015 | Kano et al. | |
| 9,110,864 B2 | 8/2015 | Jamjoom et al. | |
| 9,137,052 B2 | 9/2015 | Koponen et al. | |
| 9,231,871 B2 | 1/2016 | Mehta et al. | |
| 9,270,521 B2 | 2/2016 | Tompkins | |
| 9,282,027 B1 | 3/2016 | Brandwine et al. | |
| 9,317,469 B2 | 4/2016 | Gross et al. | |
| 9,349,135 B2 | 5/2016 | Sarshar | |
| 9,374,337 B2 | 6/2016 | Rangaraman et al. | |
| 9,391,859 B2 | 7/2016 | Huang et al. | |
| 9,401,818 B2 | 7/2016 | Venkatesh | |
| 9,450,862 B2 | 9/2016 | Chen et al. | |
| 9,497,281 B2 | 11/2016 | Jagadish et al. | |
| 9,825,810 B2* | 11/2017 | Jain | H04L 41/0813 |
| 9,866,473 B2 | 1/2018 | Parsa et al. | |
| 9,876,714 B2 | 1/2018 | Parsa et al. | |
| 10,044,617 B2 | 8/2018 | Parsa et al. | |
| 10,390,290 B1* | 8/2019 | Zhang | H04W 76/11 |
| 2003/0093481 A1 | 5/2003 | Mitchell et al. | |
| 2003/0154399 A1 | 8/2003 | Zuk et al. | |
| 2004/0018839 A1 | 1/2004 | Andric et al. | |
| 2004/0197079 A1 | 10/2004 | Latvala et al. | |
| 2005/0063324 A1* | 3/2005 | O'Neill | H04W 40/248 370/310 |
| 2005/0220098 A1* | 10/2005 | Oguchi | H04L 47/10 370/389 |
| 2006/0176882 A1 | 8/2006 | Schein et al. | |
| 2006/0193247 A1 | 8/2006 | Naseh et al. | |
| 2006/0193252 A1 | 8/2006 | Naseh et al. | |
| 2007/0061492 A1 | 3/2007 | van Riel | |
| 2007/0180226 A1 | 8/2007 | Schory et al. | |
| 2007/0201357 A1 | 8/2007 | Smethurst et al. | |
| 2008/0072305 A1 | 3/2008 | Casado et al. | |
| 2008/0098113 A1 | 4/2008 | Hansen et al. | |
| 2008/0259938 A1 | 10/2008 | Keene et al. | |
| 2009/0016354 A1* | 1/2009 | Isobe | H04L 49/90 370/395.4 |
| 2009/0097406 A1 | 4/2009 | Nilakantan et al. | |
| 2009/0129271 A1 | 5/2009 | Ramankutty et al. | |
| 2009/0193122 A1 | 7/2009 | Krishamurthy | |
| 2009/0199268 A1 | 8/2009 | Ahmavaara et al. | |
| 2009/0235325 A1 | 9/2009 | Dimitrakos et al. | |
| 2010/0046530 A1 | 2/2010 | Hautakorpi et al. | |
| 2010/0097931 A1 | 4/2010 | Mustafa | |
| 2010/0100616 A1 | 4/2010 | Bryson et al. | |
| 2010/0271964 A1* | 10/2010 | Akhter | H04L 43/0817 370/252 |
| 2010/0302940 A1* | 12/2010 | Patel | H04L 12/4633 370/230 |
| 2011/0013639 A1 | 1/2011 | Matthews et al. | |
| 2011/0026537 A1 | 2/2011 | Kolhi et al. | |
| 2011/0213888 A1* | 9/2011 | Goldman | H04L 67/322 709/228 |
| 2012/0106560 A1 | 5/2012 | Gumaste | |
| 2012/0131216 A1 | 5/2012 | Jain et al. | |
| 2012/0216282 A1* | 8/2012 | Pappu | H04L 63/1416 726/23 |
| 2012/0250682 A1 | 10/2012 | Vincent et al. | |
| 2012/0258712 A1 | 10/2012 | Rozinov | |
| 2013/0007740 A1 | 1/2013 | Kikuchi et al. | |
| 2013/0073743 A1 | 3/2013 | Ramasamy et al. | |
| 2013/0121209 A1 | 5/2013 | Padmanabhan et al. | |
| 2013/0155902 A1* | 6/2013 | Feng | G06F 11/203 370/255 |
| 2013/0163594 A1 | 6/2013 | Sharma et al. | |
| 2013/0174177 A1 | 7/2013 | Newton et al. | |
| 2013/0201989 A1 | 8/2013 | Hu et al. | |
| 2013/0227550 A1 | 8/2013 | Weinstein et al. | |
| 2013/0239198 A1 | 9/2013 | Niemi | |
| 2013/0254085 A1 | 9/2013 | Tanimoto et al. | |
| 2013/0329584 A1 | 12/2013 | Ghose et al. | |
| 2013/0332983 A1 | 12/2013 | Koorevaar et al. | |
| 2013/0336337 A1 | 12/2013 | Gopinath et al. | |
| 2014/0050091 A1 | 2/2014 | Biswas et al. | |
| 2014/0068602 A1 | 3/2014 | Gember et al. | |
| 2014/0092906 A1* | 4/2014 | Kandaswamy | H04L 45/38 370/392 |
| 2014/0115578 A1 | 4/2014 | Cooper et al. | |
| 2014/0195666 A1 | 7/2014 | Dumitriu et al. | |
| 2014/0198649 A1 | 7/2014 | Jain et al. | |
| 2014/0269733 A1 | 9/2014 | Venkatesh | |
| 2014/0297964 A1 | 10/2014 | Nakase | |
| 2014/0301388 A1 | 10/2014 | Jagadish et al. | |
| 2014/0304399 A1 | 10/2014 | Chaudhary et al. | |
| 2014/0310418 A1 | 10/2014 | Christopher et al. | |
| 2014/0323127 A1* | 10/2014 | Evans | H04L 67/125 455/435.1 |
| 2014/0380087 A1 | 12/2014 | Jamjoom et al. | |
| 2015/0106420 A1* | 4/2015 | Warfield | H04L 41/5041 709/201 |
| 2015/0146539 A1 | 5/2015 | Mehta et al. | |
| 2015/0263899 A1 | 9/2015 | Tubaltsev et al. | |
| 2015/0312155 A1 | 10/2015 | Anand et al. | |
| 2016/0006654 A1 | 1/2016 | Fernando et al. | |
| 2016/0028630 A1 | 1/2016 | Wells | |
| 2016/0028855 A1 | 1/2016 | Goyal et al. | |
| 2016/0043901 A1 | 2/2016 | Sankar et al. | |
| 2016/0065479 A1 | 3/2016 | Harper et al. | |
| 2016/0080261 A1 | 3/2016 | Koponen et al. | |
| 2016/0119229 A1 | 4/2016 | Zhou | |
| 2016/0119236 A1 | 4/2016 | DeCusatis et al. | |
| 2016/0142295 A1 | 5/2016 | Parsa et al. | |
| 2016/0142296 A1 | 5/2016 | Parsa et al. | |
| 2016/0142297 A1 | 5/2016 | Parsa et al. | |
| 2016/0142314 A1 | 5/2016 | Parsa et al. | |
| 2016/0226700 A1 | 8/2016 | Zhang et al. | |
| 2016/0241669 A1* | 8/2016 | Royon | H04L 67/327 |
| 2016/0308770 A1 | 10/2016 | Zhang et al. | |
| 2016/0315814 A1* | 10/2016 | Thirumurthi | H04L 49/35 |
| 2017/0048136 A1* | 2/2017 | Williams | H04L 69/40 |
| 2017/0085486 A1* | 3/2017 | Chung | H04L 41/044 |
| 2017/0150418 A1* | 5/2017 | Kim | H04W 40/16 |
| 2017/0195169 A1 | 7/2017 | Mills et al. | |
| 2017/0257801 A1* | 9/2017 | Toth | H04W 8/10 |
| 2018/0248805 A1* | 8/2018 | Kamat | H04L 45/28 |
| 2018/0278541 A1 | 9/2018 | Wu et al. | |
| 2019/0021029 A1* | 1/2019 | Rydnell | H04W 12/04 |
| 2019/0036815 A1* | 1/2019 | Kancherla | H04L 45/74 |

(56) References Cited

U.S. PATENT DOCUMENTS

| | | |
|---|---|---|
| 2019/0036819 A1 | 1/2019 | Kancherla et al. |
| 2019/0036881 A1 | 1/2019 | Kancherla et al. |
| 2019/0260610 A1 | 8/2019 | Dubey et al. |

FOREIGN PATENT DOCUMENTS

| | | |
|---|---|---|
| CN | 103647656 A | 3/2014 |
| CN | 103701900 A | 4/2014 |
| CN | 103930882 B | 7/2014 |
| CN | 104022891 A | 9/2014 |
| EP | 1890438 | 2/2008 |
| WO | 2008095010 | 8/2008 |
| WO | 2016076900 | 5/2016 |

OTHER PUBLICATIONS

NPL Aversa, Luis, et al., "Load Balancing a Cluster of Web Servers Using Distributed Packet Rewriting," Computer Science Department Technical Report, Jan. 6, 1999, 13 pages, Boston University, Boston, MA, USA.

NPL Dixon, Colin, et al., "An End to the Middle," Proceedings of the 12th conference on Hot topics in operating systems USENIX Association, May 2009, 5 pages, Berkeley, CA, USA.

NPL Guichard, J., et al., "Network Service Chaining Problem Statement," Network Working Group, Jun. 13, 2013, 14 pages, Cisco Systems, Inc.

NPL Joseph, Dilip, et al., "A Policy-aware Switching Layer for Date Centers," Jun. 24, 2008, 26 pages, Electrical Engineering and Computer Sciences, University of California, Berkeley, CA, USA.

NPL Koponen, Teemu, et al., "Network Virtualization in Multi-tenant Datacenters," Aug. 2013, 22 pages, VMware, Inc., Palo Alto, California, USA.

NPL Schroeder, Trevor, et al., "Scalable Web Server Clustering Technologies," IEEE Network, vol. 14, No. 3, May 1, 2000, 8 pages, IEEE Service Center, New York, NY, USA.

NPL Sekar, Vyas, et al., "Design and Implementation of a Consolidated Middlebox Architecture," 9th USENIX conference on Networked System Design and Implementation, Apr. 25-27, 2012, 14 pages.

NPL Sherry, Justine, et al., "Making Middleboxes Someone Else's Problem: Network Processing as a Cloud Service," SSIGCOMM, Aug. 13-17, 2012, 12 pages, ACM, Helsinki, Finland.

Harper, Matthew H., et al., U.S. Appl. No. 62/042,049, filed Aug. 26, 2014, 27 pages.

\* cited by examiner

METHODS FOR ACTIVE-ACTIVE STATEFUL NETWORK SERVICE CLUSTER

BACKGROUND

Stateful network services such as firewalls, load balancers, secure sockets layer (SSL) virtual private network (VPN) devices, and network address translation (NAT) devices are an essential part of any enterprise network. Stateful network services often perform deep packet processing such as SSL or TCP termination and content inspection making them significantly more CPU-intensive than software-based switches and routers. As a result, stateful network services often become the bottleneck in networks making it all the more critical to scale them as the organization needs grow.

Primarily, there are two approaches to scaling stateful network services: vertical scaling (scale-up) and horizontal scaling (scale-out). Vertical scaling, replacing the existing device with a bigger and more powerful device, is an easier solution to implement and maintain, but is often very expensive. Horizontal scaling, also referred to as active-active clustering, offers a way to build capacity gradually as demand increases, by adding more devices to the installation, but is more complex to implement and maintain. Often, primarily due to the upfront investment associated with vertical scaling, active-active clustering is preferred.

Further, in case of stateful network services in virtual-form factor (e.g., virtual network function (VNF)), vertical scaling is limited by the CPU capacity available in the physical server hosting the network service. As a result, active-active clustering is the only viable solution to scale such services.

Active-active clustering consists of a group of nodes (devices) acting in unison to meet the performance and scaling requirements. So, one of the key challenges in active-active clustering is to divide the traffic among all the nodes of the cluster. In addition, both the forward flow (incoming) and the reverse flow (outgoing) of the same session must be sent to the same node of the cluster for proper processing by the stateful network services.

In one solution, a specific node of the cluster is chosen from the cluster (typically by performing consistent hashing) for each session and both forward and reverse flow packets are redirected to that node from the nodes receiving traffic from the routers. One of the main challenges with this solution is that traffic redirection significantly lowers the performance and scalability of the solution. As a router ECMP hash is different from the consistent hash performed by a cluster node, most of the traffic will end up being redirected. Specifically, if there are N nodes in the cluster, then the probability that a packet received from the router will be redirected to another node for actual processing is (N−1)/N. So, even for a cluster of 8 nodes, almost 90% of the traffic will be redirected to another node. Since both forward and reverse traffic needs to be redirected, effective throughput is thus reduced. Redirecting so much traffic will also have significant impact on the CPU.

An ECMP-based alternative to the above methods is desired that allows for active-clustering and that minimizes, and in some cases completely eliminates, traffic redirection for virtualized environments.

BRIEF SUMMARY

For a managed network, some embodiments provide a method for a set of service nodes in an active-active service node cluster to improve the efficiency of directing a data message to a service node storing state information for the flow to which the data message belongs.

In some embodiments, a first service node receives a data message in a particular data message flow for which it does not maintain state information. The first service node then identifies a second service node to process the data message and forwards the data message to the second service node. The second service node sends state information for the particular data message flow to the first service node, for the first service node to use to process subsequent data messages in the particular data message flow. Session state information in some embodiments includes, for example, a connection state of the data message flow.

The second service node in some embodiments, processes the data message and forwards the processed data message along with information identifying a primary service node to a host computer on which a destination DCN executes. The host computer can use the identifying information to forward return data messages to the primary service node. In some embodiments, the second service node identifies itself as the primary service node, while in other embodiments the second service node identifies the first service node as the primary service node. For data messages received at the first service node after the first service node receives the state information from the second service node, the first service node processes the data message. In an embodiment in which the second service node identified itself as the primary service node, the first service node sends, along with a processed data message, information identifying itself as the primary service node and optionally identifying the second service node as a secondary service node to replace the identifying information sent by the second service node. In some embodiments, the information identifying the primary (and secondary) service node is sent in a first data message. A first number (e.g., ten) of messages include the identifying information in some embodiments, where the number of messages is configured to ensure receipt by the destination despite some data messages being lost. In some embodiments, a host computer will send information identifying the primary and secondary (and tertiary) service nodes stored by the host computer's forwarding table, and if they match the information sent by the primary service node, the information is not provided in future data messages.

In some embodiments, the data message is sent to the first service node based on a first membership of a network service cluster including the service nodes. In such embodiments, previous data messages in the data flow were sent to a third service node based on a previous, different membership. The second service node in such embodiments is identified based on the previous, different membership. In some embodiments, the second service node is a backup service node identified by a function shared by all service nodes for identifying a backup service node for a given data message flow and network service cluster membership.

When a network service cluster membership changes, each service node that is a primary service node for a set of data message flows according to a previous cluster membership in some embodiments detects the change in membership. After detecting the change in membership, the primary service node storing state information for processing data messages in the set of data message flows determines, for each data message flow in a subset of the set of data message flows, that a secondary service node according to the previous cluster membership is no longer the secondary service node according to the current, changed cluster membership. The primary service node then sends state information, for example a connection state of a data message flow, to the service node identified as the secondary service node according to the current, changed cluster membership for each data message flow in the subset of data message flows. A network service cluster membership change may include removing a node (e.g., upon node failure or underutilization) or adding a node (e.g., when the load on the service nodes is above a threshold load).

In some embodiments, after detecting a change in membership, each service node that is a secondary service node for a second set of data message flows according to the previous cluster membership also identifies a subset of the second set of data message flows for which it is no longer the secondary service node according to the current, changed cluster membership. The secondary service node identifies the new secondary service node according to the current changed membership and sends the state information to the new secondary service node in case the primary service node for those data message flows has failed.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matters are not to be limited by the illustrative details in the Summary, Detailed Description and the Drawings, but rather are to be defined by the appended claims, because the claimed subject matters can be embodied in other specific forms without departing from the spirit of the subject matters.

BRIEF DESCRIPTION OF THE DRAWINGS

The novel features of the invention are set forth in the appended claims. However, for purposes of explanation, several embodiments of the invention are set forth in the following figures.

DETAILED DESCRIPTION

Figure 1A:
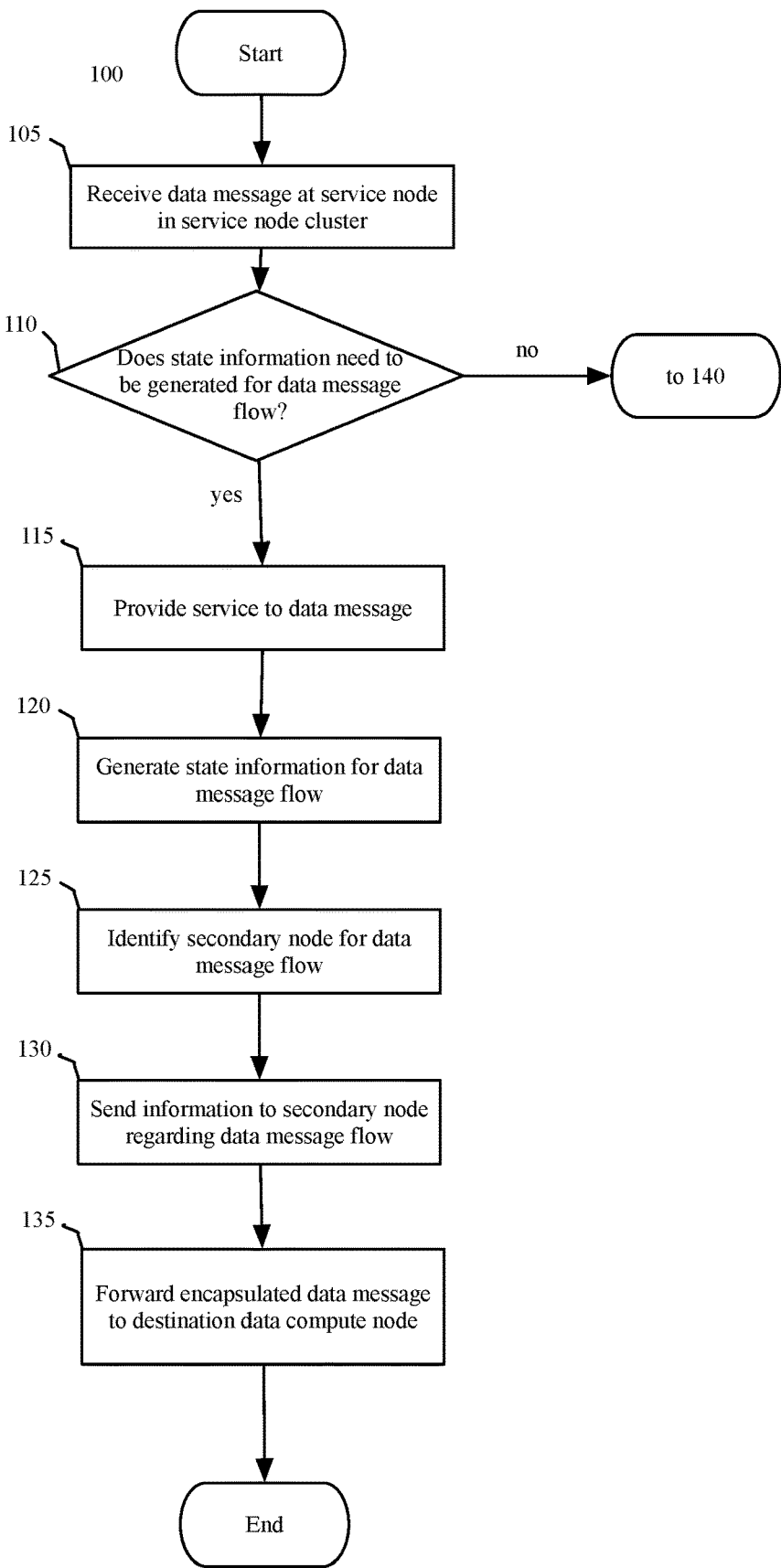
FIGS. 1A-C conceptually illustrate a process of some embodiments for processing a data message received at a primary service node and identifying the primary service node to a host computer hosting a destination DCN.

In the following description, numerous details are set forth for the purpose of explanation. However, one of ordinary skill in the art will realize that the invention may be practiced without the use of these specific details. In other instances, well-known structures and devices are shown in block diagram form in order not to obscure the description of the invention with unnecessary detail.

For a managed network, some embodiments provide a method for a set of service nodes in an active-active service node cluster to improve the efficiency of directing a reverse-flow packet to a service node storing state information for the flow to which the packet belongs. In some embodiments, a first service node receives a data message in a particular data message flow for which it does not maintain state information. The first service node then identifies a second service node to process the data message and forwards the data message to the second service node. The second service node sends state information for the particular data message flow to the first service node, for the first service node to use to process subsequent data messages in the particular data message flow. Session state information in some embodiments includes, for example, a connection state of the data message flow.

As used in this document, the term data message, message, data packet, or packet refers to a collection of bits in a particular format sent across a network. It should be understood that the term data message, message, data packet, or packet may be used herein to refer to various formatted collections of bits that may be sent across a network, such as Ethernet frames, IP packets, TCP segments, UDP datagrams, etc. While the examples below refer to data messages, messages, data packets, or packets, it should be understood that the invention should not be limited to any specific format or type of data message. Also, as used in this document, references to L2, L3, L4, and L7 layers (or layer 2, layer 3, layer 4, layer 7) are references respectively to the second data link layer, the third network layer, the fourth transport layer, and the seventh application layer of the OSI (Open System Interconnection) layer model.

Some embodiments make use of an overlay network. An overlay network may refer to a logical L2 or L3 network that is implemented using an underlying physical network. An overlay network includes in some embodiments a set of host computers hosting DCNs of the overlay network along with a set of managed physical forwarding elements (MPFEs or MFEs) (e.g., switches, routers, bridges, etc.). The MFEs implement logical forwarding elements (LFEs) (e.g., logical switches, logical routers, logical bridges, etc.) that make up the logical L2 or L3 networks. MFEs may logically process data messages for a particular LFE or set of LFEs in a logical network and use the underlying physical network to deliver the data message to a destination DCN in the overlay network or that exists outside the overlay network. An overlay network may be implemented using tunnels between host computers (e.g., using virtual extensible local area network (VXLAN) tunnel endpoints (VTEPs) executing on the host computers). In using tunnels, host computers in some embodiments encapsulate data messages so that they are addressed to the tunnel endpoint of the host computer hosting the destination DCN, which then decapsulates the data message and delivers it to the destination DCN.

Figure 1B:
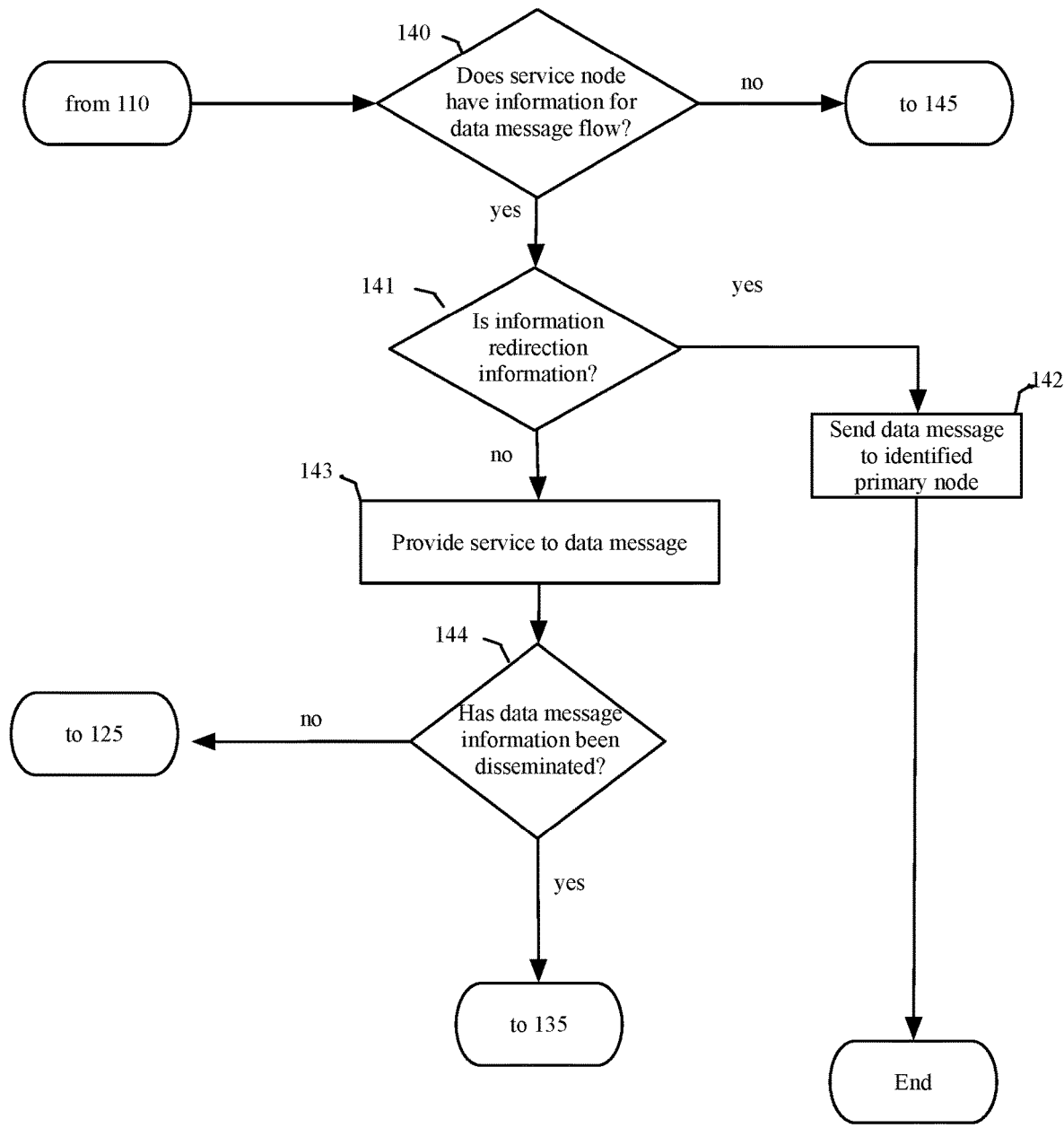
Figure 1C:
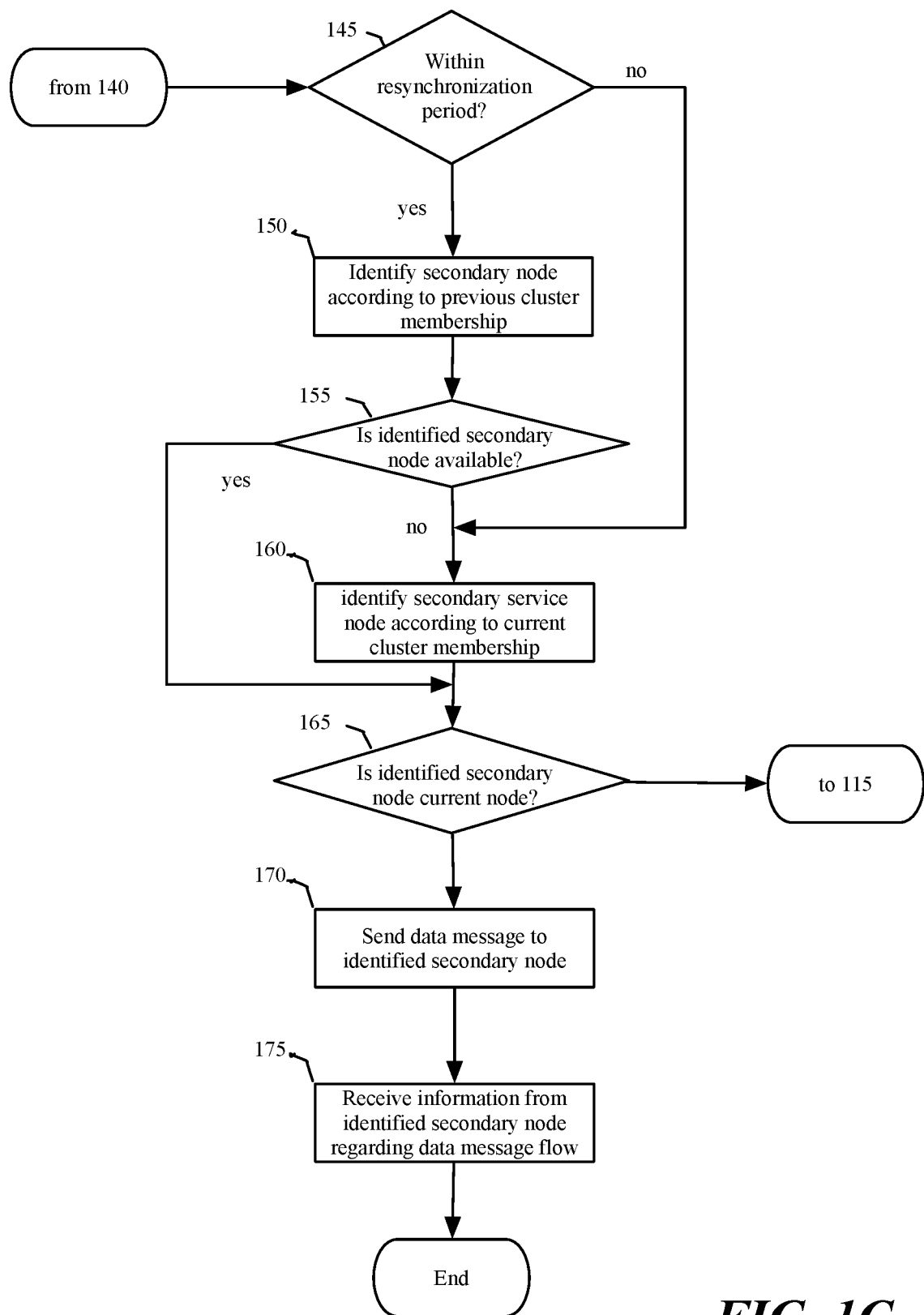

FIGS. 1A-C illustrates process 100 of some embodiments for processing a data message and identifying a primary service node to a host computer hosting a destination DCN. Process 100 in some embodiments is carried out by a service node. In some embodiments, the service node is part of a service node cluster that is configured in an active-active configuration in which a set of service nodes provide the network service to a set of data message flows. Process 100 begins (at 105) by receiving a data message in a data message flow. In some embodiments, the data message originates from a client compute node and is received through a forwarding element (e.g., a switch or router) that performs equal-cost multipath (ECMP) routing, a load balancing operation, or a similar type of operation, to determine the service node to which it sends the data message.

The process determines (at 110) whether the data message requires state information to be generated. State information generation is required for first data messages in data message flows or if a data message is a first data message received at the service node in the data message flow after an idle time has elapsed since a last cluster membership change, an idle time being the period for which state information for a data message flow is maintained after a data message in the data message flow is received before discarding the state information to conserve resources (e.g., memory). In some embodiments, a determination that a data message is a first data message in a data message flow is made based on the nature of the data message (e.g., if it is a SYN data message indicating the beginning of a data message flow). If the data message requires state information generation, the process provides (at 115) the service provided by the service node cluster (e.g., a firewall, a load balancers, secure sockets layer (SSL) virtual private network (VPN) service, network address translation (NAT), etc.) and generates (at 120) state information for the data message flow. For some services (e.g. NAT), state information generation occurs before providing the service so as to use the original data message attributes to calculate a secondary service node, for other services (e.g., load balancing) state information generation occurs after providing the service to include the result of providing the service in the generated state information. For some data message flows, state information (e.g., a layer 4 load balancing state indicating the backend server for the data message flow) changes infrequently after state information is initially generated (referred to as per-flow or per-session state information). For other data message flows, state information may change with each received packet (referred to as per-packet state information).

The process then identifies (at 125) a set of secondary service nodes. When a change in cluster membership has occurred recently, i.e., the time for resynchronization of state information (i.e., a resynchronization time) has not elapsed since the change, secondary service nodes are identified according to a current service node cluster membership as well as a previous service node cluster membership. The previous service node cluster membership in some embodiments is a service node cluster membership immediately before a set of changes that occur within a resynchronization time of each other (e.g., the resynchronization time does not elapse between any change in membership and the next change in membership). Resynchronization time in some embodiments is preconfigured. In some embodiments, the resynchronization time is determined based on a time for a primary node to analyze its entire flow table. The time in some embodiments is computed based on a size of the flow table which is determined in some embodiments by an amount of memory available for the flow table and a configuration of the service node.

When a resynchronization time has elapsed since the last membership change, the set of secondary service nodes includes only the service node according to a current service node cluster membership. In some embodiments, the secondary service node is identified by a consistent hash of attributes of the data message (e.g., a set of header field values) used by each service node in the service node cluster that associates a hash result with a specific service node in the service node cluster membership to identify a secondary service node. In some embodiments, the attributes of a data message that are used to calculate the secondary service node are the original data message attributes before providing a network address translation service or other service that affects the attributes used to calculate the secondary service node. The secondary service node is used in some embodiments as a backup service node when a primary service node is not available or cannot be identified.

If the node identified (at 125) is the primary service node, a next node in the service cluster is designated as the secondary service node. A next node in some embodiments, is defined based on an ordering of a current cluster membership and may be either an immediately previous or immediately subsequent service node depending on the primary service node's position in the ordered list of service nodes (e.g., previous for odd-numbered service nodes and subsequent for even-numbered service nodes). A data message directed to a different service node identifies the primary service node as the secondary service node using the consistent hash when it is available, and a host computer identifies the secondary service node based on a forwarding table, described below, when the primary service node is not available.

After identifying the set of secondary service nodes, the process sends (at 130) information to the identified set of secondary service nodes regarding the data message flow. For per-session state information, the information is the generated state information. For per-packet state information, in some embodiments instead of sending the state information after every received data message, the process sends redirect information indicating the primary service node. The state information in some embodiments is sent as an out-of-band control message, while in others it is sent in-band directly to the secondary service node. It is to be understood that for per-flow (or per-session) state information, the identification of the secondary service node and sending the state information to the secondary service node need not be performed for every received data message, but is performed at least when the state information changes. In some embodiments, for data messages that are identified as important or critical according to some set of criteria configured in the system or by a user, the process identifies a tertiary service node according to a second consistent hash of attributes of the data message that is also sent the state information and is identified in the forwarded data message.

The process then forwards (at 135) the serviced data message to the destination data compute node. It is to be understood that for some services provided by a network service cluster, providing the service to the data message determines the state information (e.g., a load-balancing service determines the server to which data messages of the data message flow are directed). In such embodiments, providing the service takes place before the state information generation.

As part of forwarding (at 135) the data message to the destination DCN, the process includes information regarding a primary and secondary service node for the data message. In some embodiments, the primary service node is the node that provides the service and forwards the data message to the destination DCN and the secondary service node is the secondary service node identified at 120. The information regarding the primary and secondary service nodes in some embodiments is included as part of an encapsulation process to deliver the data message to a tunnel endpoint executing on the host computer hosting the destination DCN. The encapsulation header in such embodiments contains the information identifying the primary and secondary service nodes. It is understood that the inclusion of identifying information for the primary and secondary service nodes need only be performed until a destination host computer has populated its forwarding table with the current primary and secondary (and tertiary) service nodes. In some embodiments, a host computer will send information identifying the primary and secondary (and tertiary) service nodes stored by the host computer's forwarding table, and if they match the information sent by the primary service node, the information is not provided in future data messages. Other methods of confirming receipt of primary and secondary service node information will be appreciated by one of ordinary skill in the art. In some embodiments, every message includes the information regarding the primary and secondary (and tertiary) service nodes.

The identification of the service nodes in some embodiments includes network layer (e.g., internet protocol (IP)) addresses, data link layer (e.g., media access control (MAC)) addresses, or both (e.g., IP and MAC addresses) for the specific service nodes instead of a virtual network layer address or data link layer address used to address the service node cluster generally. By identifying the specific service nodes, the process allows data messages in the data message flow to be returned to the specific service node that stores state information for the data message flow, instead of going through a load balancing operation on the return path based on the virtual IP address of service node cluster that may or may not direct the return data message to a service node storing state information for the data message flow. A forwarding table in some embodiments is a table maintained by a host (e.g., in a hypervisor) that identifies data message flows and the service nodes (e.g., primary, secondary, and tertiary service nodes) associated with the data message flows. The forwarding table in some embodiments stores the network layer and data link layer addresses provided in the encapsulation header of a forwarded data message. Additional details regarding the configuration of the host computer with the information regarding the service nodes is described in U.S. patent application Ser. No. 15/665,135, entitled "Use of Hypervisor for Active-Active Stateful Network Service Cluster," concurrently filed with this application and now issued as U.S. Pat. No. 11,296,984. This concurrently filed U.S. patent application Ser. No. 15/665, 135, now issued as U.S. Pat. No. 11,296,984, is incorporated herein by reference.

For a data message that is not determined (at 110) to require state information generation, the process determines (at 140) whether the service node maintains information for the data message flow. A service node in some embodiments maintains information if it has previously received information based on data messages previously received by the service node or was previously a backup service node for the data message flow according to a different network service cluster membership. If the process determines (at 140) that the service node does maintain information for the data message flow, it determines (at 141) whether the information is redirection information. If the process determines (at 141) that the information is redirection information, it sends (at 142) the data message to the identified primary service node and the process ends. In some embodiments, sending the data message to the primary service node for the data message flow includes sending redirection information to a secondary service node according to the current cluster membership.

If the process determines (at 141) that the information for the data message flow is not redirection information, but is instead state information, the process provides (at 143) the service provided by the service node cluster and determines (at 144) whether information regarding the data message flow has been disseminated. This determination in some embodiments is made based on a confirmation from a host computer or a secondary service node that information regarding the data message flow has been received, or based on information stored at the service node indicating that the information has been sent a requisite number of times (e.g., ten times to ensure receipt despite possible loss in network). In some embodiments, the determination whether information regarding the data message flow has been disseminated includes determining whether the information has been disseminated since a last change in either the information or a calculated secondary service node. If the process determines (at 144) that the information regarding the data message flow has not been disseminated, the process identifies (at 125) a set of secondary service nodes, sends (at 130) state information to the identified set of secondary service nodes, and forwards (at 135) the data message to the destination DCN. The forwarded data message in some embodiments includes the information regarding a primary and secondary service node for the data message flow as discussed above.

If the process determines (at 144) that the information regarding the data message flow has been disseminated, the process forwards (at 135) the data message to the destination DCN. In some embodiments, forwarding the message (at 135) does not include providing the information regarding a primary and secondary service node for the data message flow as that information was already provided.

If the process determines (at 140) that the service node does not maintain state information for the data message flow, the process determines (at 145) if a service node cluster membership has changed within a resynchronization time. If the process determines (at 145) that the service node cluster membership has changed within a resynchronization time, the process identifies (at 150) a secondary service node according to a previous cluster membership. The previous cluster membership in some embodiments is the service node cluster membership immediately before a set of changes that occur within a resynchronization time of each other (e.g., the resynchronization time does not elapse between any change in membership and the next change in membership). The identification of the secondary service node uses the identification function used to identify secondary service nodes for the previous cluster membership (e.g., the immediately previous cluster membership or a last cluster membership before a resynchronization process began). The secondary service node thus identified either generates state information or has state (or redirection) information for the data message flow based on a primary service node identifying and sending state (or redirection) information to the secondary service node as described above (120-130), or based on a resynchronization process after a previous cluster membership change as discussed in relation to FIG. 3 below.

An identification function in some embodiments, is a consistent identification function (e.g., a consistent hash) configured so that upon node failure only the data message flows using the failed node as a secondary service node have different secondary service nodes identified. For example, if a consistent hash assigns all possible hash results (e.g., A-Z) to three current members of a network service cluster (e.g., hash A-G to node 1, hash H-P to node 2, and hash Q-Z to node 3), and a particular node (e.g., node 2) fails, only the hash results associated with node 2 are reassigned (e.g., hash H-K to node 1 and L-P to node 3) while other hash results remain associated with the same service nodes as before (e.g., A-G still associated to node 1). Such a consistent hash reduces the need for sending state information to newly identified secondary service nodes after a node failure because other than the failed secondary service node, all other secondary service nodes remain the secondary service nodes for all data message flows they previously served as secondary service nodes.

Once the process identifies (at 150) the secondary service node, the process determines (at 155) whether the identified secondary service node according to the previous cluster membership is available (i.e., still a member of the network service cluster). If the process determines (at 155) that the secondary service node is not still available or if the process determines (at 145) that a resynchronization time has elapsed since the last membership change, the process identifies (at 160) a secondary service node according to the current cluster membership. Once the process identifies (at 150-160) an available secondary service node, the process determines (at 165) whether it is the identified service node.

If the process determines (at 165) that it is the identified service node it treats the data message as belonging to a data message flow requiring state information generation and proceeds to 115. If, however, the process determines that it is not the identified secondary service node, the process sends (at 170) the data message to the identified secondary service node for the secondary service node to process and forward to the application DCN. The process then receives (at 175) state (or redirection) information from the secondary service node to allow the processing of future data messages of the data message flow. The process then ends.

Figure 2:
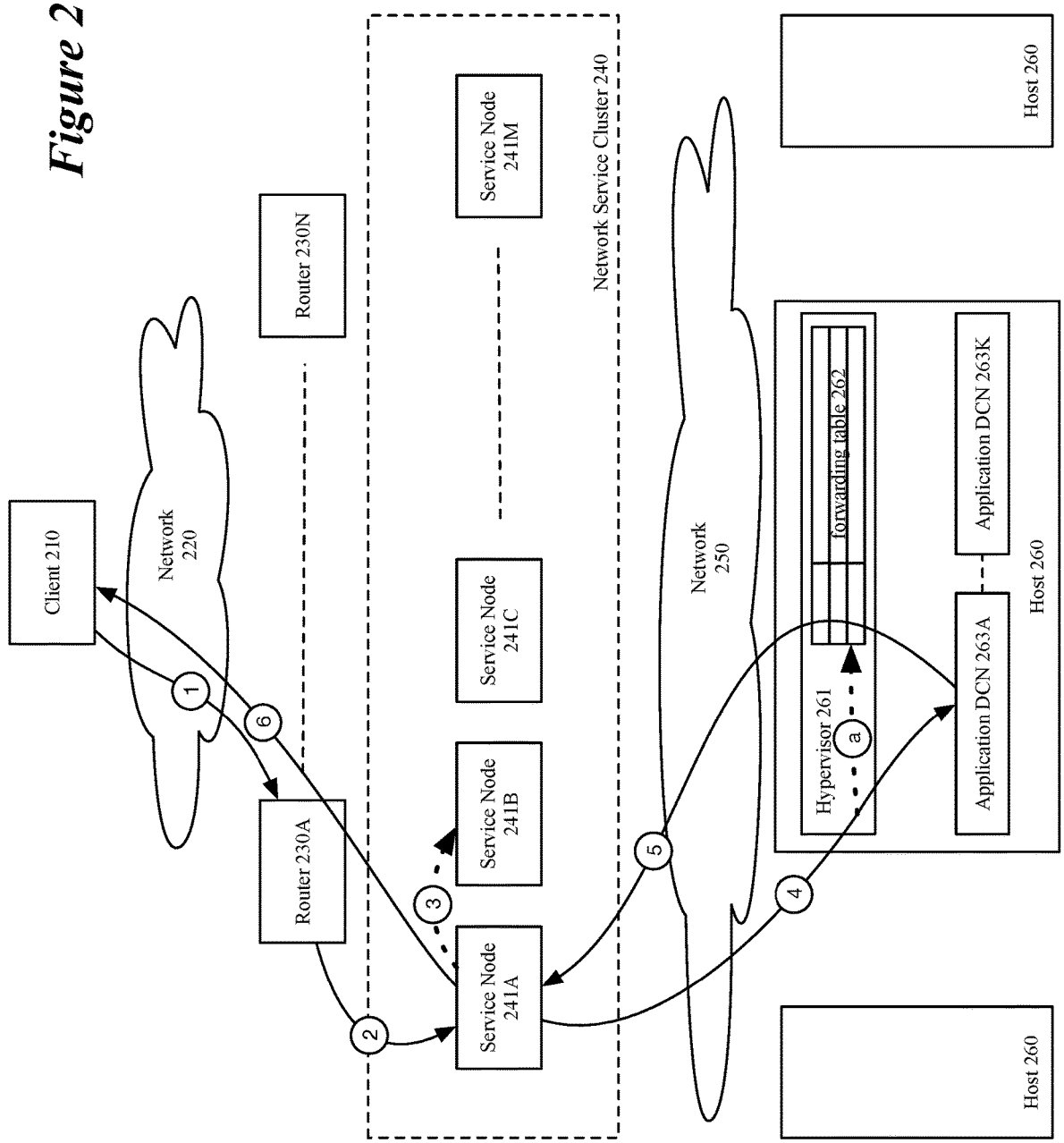
FIG. 2 conceptually illustrates a series of data messages exchanged for a data message flow requiring per-session state information originating at a client.

FIG. 2 conceptually illustrates a series of data messages exchanged for a data message flow requiring per-session state information originating at a client. FIG. 2 depicts data message 1 being sent from a client compute node 210, ultimately to application DCN 263A, through network 220 and router 230A. Router 230A forwards the data message to service node 241A in network service cluster 240 based on the criteria applied by router 230A. As router 230A is not controlled by a tenant in some embodiments, the criteria for forwarding a data message to a particular service node in network service cluster 240 are not able to be determined a priori and any service node 241 may receive a particular data message. While the service node may not be determinable a priori, it is assumed that given a stable network service cluster membership, routers 230 will send data messages belonging to a same data message flow to a same service node.

Once the data message is received by service node 241A, as described above for process 100, service node 241A identifies a secondary service node and sends, as data message 3, the state information for the data message flow to which data message 1 belongs. In some embodiments, the secondary service node is a backup service node that can be identified (e.g., using a consistent hash) by any service node receiving subsequent data messages in the particular data message flow. For example, if the primary service node fails or a network service cluster membership changes and router 230 begins forwarding data messages in the particular flow to a different service node that does not maintain the state information for the data message flow, the service node receiving the data message (the new primary service node) can identify the secondary service node and forward the data message to the secondary service node. The secondary service node can then process the data message using the stored state information and send the state information to the new primary service node to be used to process future data messages for the particular flow.

Data message 4 represents the encapsulated data message after the network service has been provided by service node 241A. As described above in relation to process 100, data message 4 includes information regarding the primary service node (e.g., 241A) and the secondary service node (e.g., 241B). Data message 4 is processed by the host computer (e.g., by hypervisor 261) to extract the primary and secondary service node information and populate forwarding table 262 as indicated by the arrow labeled 'a' and as described in more detail in U.S. patent application Ser. No. 15/665,135, entitled "Use of Hypervisor for Active-Active Stateful Network Service Cluster," concurrently filed with this application and now issued as U.S. Pat. No. 11,296,984. Application DCN 263A receives data message 4 and sends as a response data message 5.

Data message 5 in some embodiments is directed by DCN 263A to a network address for network service cluster 240, or client 210 instead of a specific network address for service node 241A. When host 260 processes the data message (e.g., in hypervisor 261) it performs a lookup in forwarding table 262 to determine whether the data message flow to which the data message belongs has an entry. In the embodiment shown in FIG. 2, the forwarding table would have an entry for data message 5's flow based on the previously received data message 4. In some embodiments, host 260 replaces the network address for network service cluster 240 with the network address specified in forwarding table 262 for primary service node 241A. In some embodiments, host 260 encapsulates data message 5 and uses the network address of primary service node 241A in the encapsulation header. The replaced or encapsulation network address avoids any load balancing or other distribution operations that may be performed as the data message traverses network 250 on the return path that could cause the data message to be forwarded to a service node not maintaining state information for the data message flow. After processing the return data message 5, service node 241A forwards the processed return data message 6 to client 210 through, e.g., router 230A.

In addition to providing the service provided by a network service cluster, when a network service cluster membership changes, each service node that is a primary service node for a set of data message flows according to the immediately previous cluster membership in some embodiments detects the change in membership. After detecting the change in membership, the primary service node storing state information for processing data messages in the set of data message flows determines, for each data message flow in a subset of the set of data message flows, that a secondary service node according to the immediately previous cluster membership is no longer the secondary service node according to the current, changed cluster membership. The primary service node then sends state information, for example a connection state of a data message flow, to the service node identified as the secondary service node according to the current, changed cluster membership for each data message flow in the subset of data message flows. A network service cluster membership change may include removing a node (e.g., upon node failure or underutilization) or adding a node (e.g., when the load on the service nodes is above a threshold load). Host computers (or hypervisors executing on host computers) and upstream and downstream routers in some embodiments are informed of the removal of a service node from a network service cluster. In some embodiments, host computers (hypervisors) are informed of service node availability through a management or control plane operation, while routers are informed through standard router/gateway protocols that the address of the failed/added service node is no longer/is now available. In some embodiments, hosts (hypervisors) establish bidirectional forwarding detection (BFD) sessions with individual service nodes to monitor service node availability.

Figure 3:
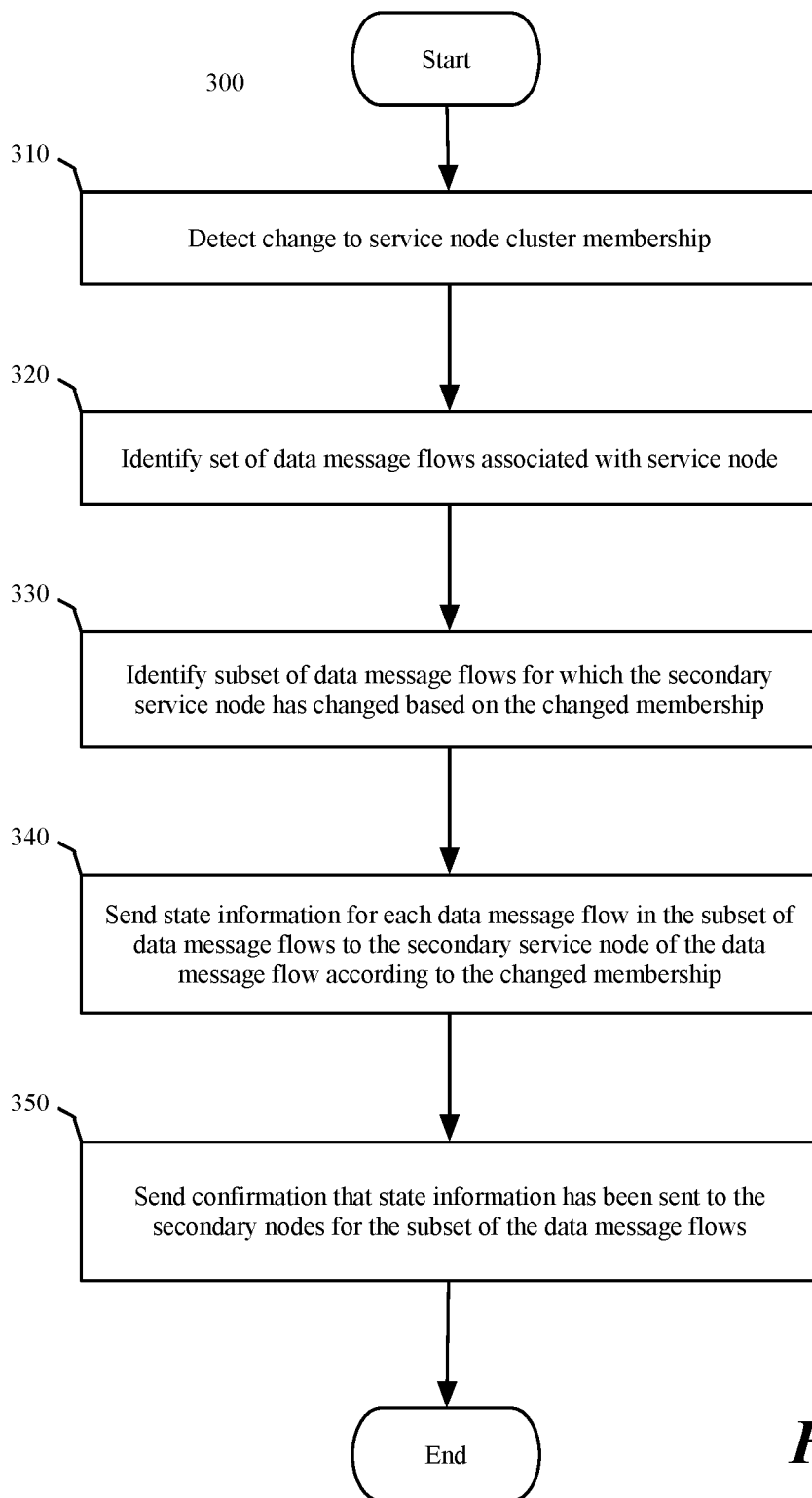
FIG. 3 conceptually illustrates a process of some embodiments for resynching state information after a network service cluster membership change.

FIG. 3 conceptually illustrates a process 300 of some embodiments for resynching state information after a network service cluster membership change. In some embodiments, each service node that is a member in both the previous and current network service cluster membership performs process 300 after a change to a cluster membership. Process 300 begins by detecting (at 310) that a cluster membership has changed. A networks service cluster membership change may be an addition or a removal (or failure) of a service node from the cluster. In some embodiments, the service nodes in the network service cluster receive updates to cluster membership information from a management application that monitors the status of the service nodes in the cluster.

After detecting that the membership has changed, the process identifies (at 320) the set of data message flows associated with a service node. In embodiments using a consistent identification function as described above (e.g., a consistent hash for which, upon node failure, a secondary service node associated with a particular data message flow remains a secondary service node for that flow according to both previous and current cluster memberships) the set of data message flows identified is the set of data message flows for which the service node is a primary service node. In other embodiments in which a node failure may cause at least one secondary service node to no longer be associated with a data message flow as the secondary service node (e.g., when an inconsistent hash is used or when a node failure and addition happen within a resynchronization time), the identified set of data message flows is the set of data message flows for which a service node is either a primary or secondary service node.

The process then identifies (at 330) a subset of the set of data message flows identified (at 320) for which a secondary service node has changed based on the changed cluster membership. A secondary service node for a data message flow changes when a first service node is identified as the secondary service node according to an identification function applied to a previous cluster membership and a second service node is identified as the secondary service node according to the identification function applied to the current cluster membership. The subset of data message flows for which the secondary service node has changed includes at least data message flows for which a failed or removed service node was identified as the secondary service node according to the previous cluster membership.

The process then sends (at 340) information regarding the data message flows (e.g., state information for per-session flows and redirect information for per-packet flows) to a set of secondary service nodes identified for each of the subset of data message flows. In some embodiments the identification is similar to the one performed in process 100 (at 125) Once the information regarding the data message flows is sent to all the secondary service nodes, the process sends (at 350) a confirmation that state (or redirection) information has been sent to the secondary service nodes according to the current cluster membership. In some embodiments, this confirmation is sent to a management process to be communicated to the other service nodes. Confirmation messages are sent directly to other service nodes in some embodiments. Once confirmation messages have been sent and received from all other service nodes, a particular service node can begin using the current membership to identify a secondary service node for any new data messages it receives. This confirmation message is a condition that is sufficient to move to the new cluster membership in addition to waiting for resynchronization time after a cluster membership change as discussed in relation to FIG. 1. In some embodiments, confirmation messages are not sent and the passing of the resynchronization time from the last cluster membership change is used as the condition for using the new cluster membership to calculate the secondary service nodes.

FIGS. 4-7 conceptually illustrate scenarios in which different service nodes fail or are added to a network service cluster and first data messages are received before a resynchronization time has elapsed after the membership change. Each of FIGS. 4-7 assume that the network service cluster begins with four service node members (e.g., 441A-D) and that the primary service node according to the original service node membership is the first service node (e.g., 441A) and that the secondary service node according to the original service node membership is the second service node (e.g., 441B).

Figure 4:
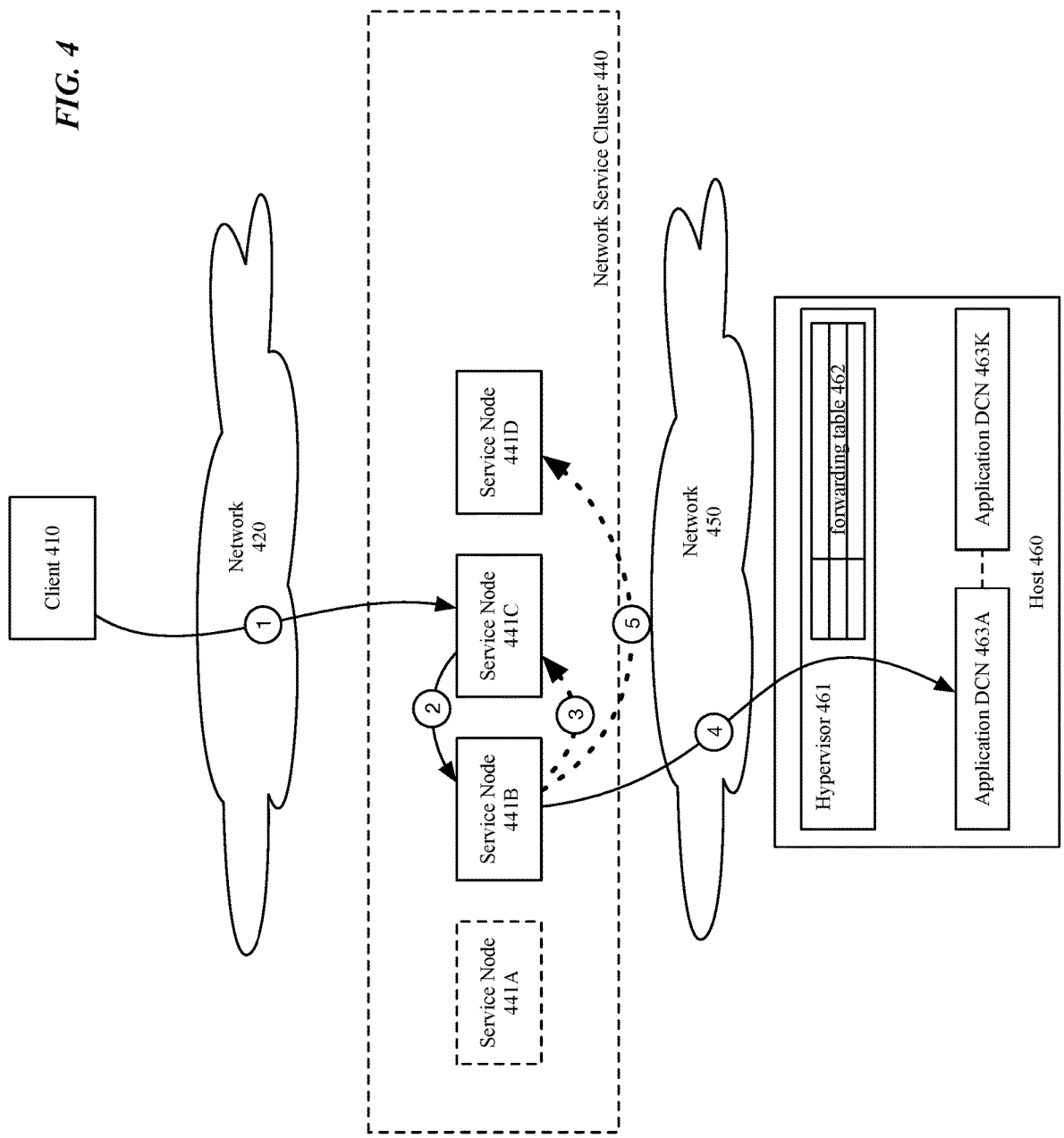
FIG. 4 conceptually illustrates a series of data messages in a data message flow exchanged when a primary service node for the data message flow is removed from a service node cluster.

FIG. 4 conceptually illustrates a series of data messages related to a data message flow after service node 441A, a primary service for the data message flow node according to a previous network service cluster membership, is removed or fails. Before a resynchronization time has elapsed after the membership change, client 410 sends data message 1 which, based on the new cluster membership is directed to service node 441C as the new primary service node based on a load balancing or ECMP function performed in network 420. Service node 441C receives the data message and, not having state information, identifies the secondary service node according to the previous cluster membership (441B). Service node 441C forwards the message to service node 441B as data message 2 for service node 441B to process. If a first data message is received after resynchronization, the secondary service node is identified based on a current cluster membership, but otherwise the data messages are similar.

In response to receiving the data message from service node 441C, service node 441B sends, as data message 3, the state (or redirection) information for the data message flow to which the received data message belongs to service node 441C. Service node 441C can use state information received from service node 441B to process future data messages received for the data message flow. If the data message flow requires per-packet state information, the redirection information in some embodiments is sent, but future data messages are dropped based on the fact that the identified primary service node is no longer a member of the network service cluster.

In addition to sending data message 3, service node 441B processes the data message using the state information it stores as the secondary service node for the data message flow. Service node 441B then sends the processed data message as data message 4 to the destination DCN, application DCN 463A. Data message 4 in some embodiments includes information regarding primary and secondary service nodes according to the changed cluster membership. In some embodiments, data message 4 identifies the primary service node as service node 441B which persists until service node 441C processes a first data message for the data message flow and identifies itself as the primary service node and service node 441D as the secondary service node. In other embodiments, data message 4 identifies the primary service node as service node 441C and itself, service node 441B, as the secondary service node. As the embodiment depicted in FIG. 4 does not use a consistent hash (the secondary service node has changed even though the secondary service node has not failed), service node 441B also identifies a secondary service node according to the changed network service cluster membership (i.e., service node 441D) and forwards, as data message 5, the state information for the data message flow according to process 300 described above. In some embodiments, data message 5 is omitted and service node 441D receives state information as part of a resynchronization process.

After the failure of the primary service node 441A for the data message flow, data messages originating from application DCN 463A will be intercepted by hypervisor 461 in some embodiments and forwarded to service node 441B as the identified secondary service node. Service node 441B processes the data message using the stored state information and forwards the processed data message to client 410. Hypervisor 461 continues to send data messages from application DCN 463A to client 410 to service node 441B until the forwarding table in the hypervisor is updated by either of service nodes 441B or 441C to identify service node 441C as the primary service node for the data message flow, at which point data messages in both directions are directed to service node 441C. The use of hypervisors to maintain and use primary and secondary service node information for a data message flow is described in more detail in U.S. patent application Ser. No. 15/665,135, entitled "Use of Hypervisor for Active-Active Stateful Network Service Cluster," concurrently filed with this application and now issued as U.S. Pat. No. 11,296,984.

Figure 5:
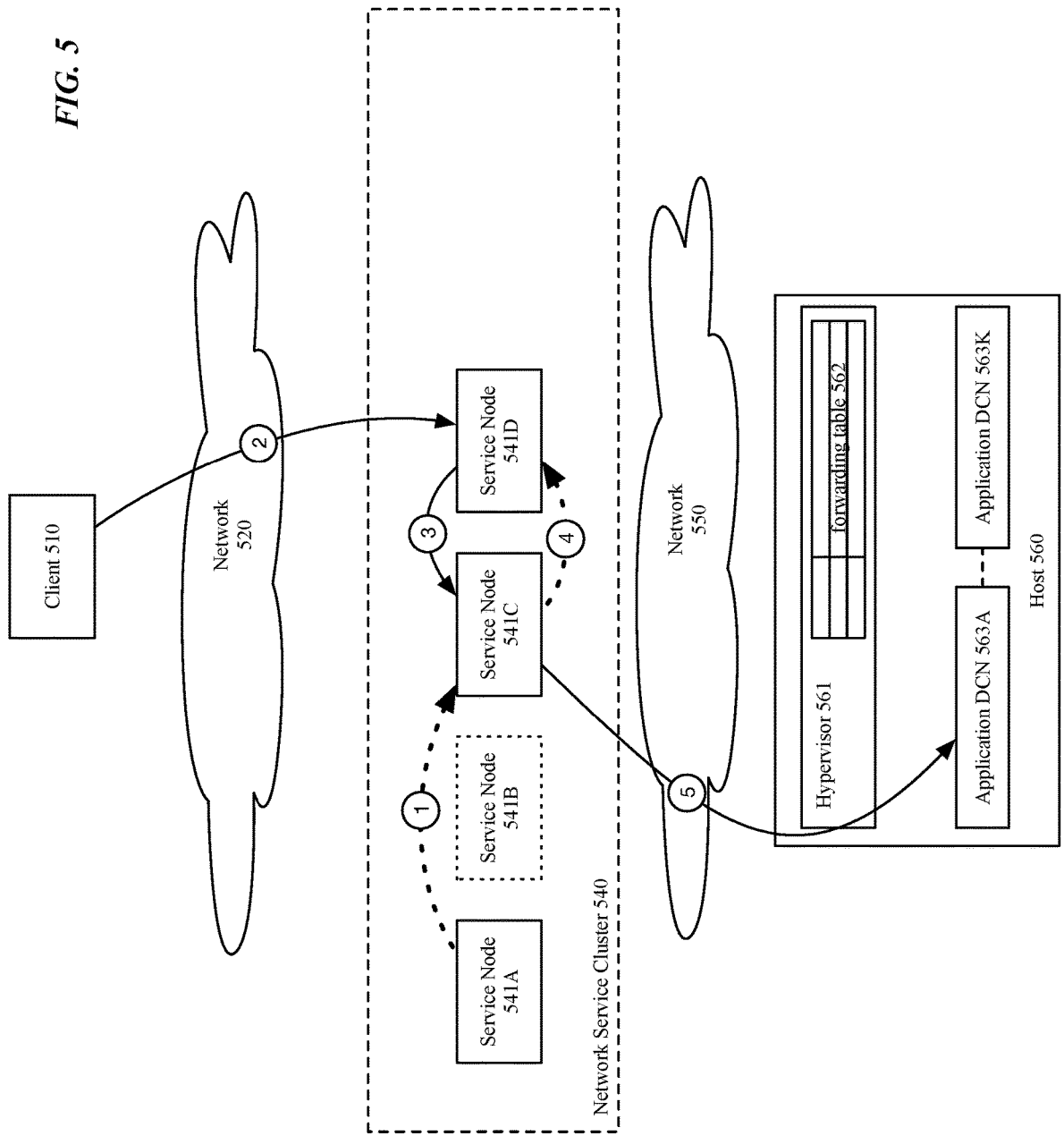
FIG. 5 conceptually illustrates a series of data messages in a data message flow exchanged when a secondary service node for the data message flow is removed from a service node cluster.

FIG. 5 conceptually illustrates a series of data messages related to a data message flow after service node 541B, a secondary service node for the data message flow according to a previous network service cluster membership, is removed or fails. After detecting the failure of the secondary service node, service node 541A identifies a secondary service node according to the changed network service cluster membership (i.e., service node 541C) and forwards, as data message 1, the state (or redirection) information for the data message flow according to process 300 described above.

After the cluster membership changes, client 510 sends data message 2 which, based on the new cluster membership, is directed to service node 541D as the new primary service node based on a load balancing or ECMP function performed in network 520. Service node 541D receives the data message and, not having state information, identifies the secondary service node according to the previous cluster membership (541B) as the data message was received before a resynchronization time has elapsed since the last membership change. However, since the secondary service node according to the previous cluster membership is no longer a member of the network service cluster, service node 541D identifies the secondary service node according to the current cluster membership (541C). Service node 541D forwards the message to service node 541C as data message 3 for service node 541C to process (or redirect).

In response to receiving the data message from service node 541D, service node 541C sends, as data message 4, the state (or redirection) information for the data message flow to which the received data message belongs to service node 541D. Service node 541D can use state information received from service node 541C to process future data messages received for the data message flow. If the data message flow requires per-packet state information, the redirection information is used to redirect future data messages to primary service node 541A. If data message 1 not received by service node 541C before data message 3, data message 3 (and similar redirected data messages received before state information is received at service node 541C) will be dropped. Once the state information is received by service node 541C, data message processing will proceed as described above.

For data message flows requiring per-session state information, service node 541C processes the data message using the state information it stores as the secondary service node for the data message flow. Service node 541C then sends the processed data message as data message 5 to the destination DCN, application DCN 563A. However, for data message flows requiring per-packet state information, service node 541C forwards the data message to service node 541A for service node 541A to process and forward to the destination DCN, application DCN 563A (not shown).

When a secondary service node fails, data messages originating at an external client (e.g., client 510) cannot be processed by the secondary service node according to the current cluster membership until it receives state information. To minimize the data messages dropped for critical applications, in some embodiments a tertiary service node is identified as discussed above in relation to FIG. 1. When the secondary service node according to the previous cluster membership fails, the service node receiving the data message (e.g., 541D) identifies the tertiary service node after identifying the secondary service node because it is aware that the identified secondary service node is no longer a member of the network service cluster. This ensures that the service node to which the packets are forwarded has the requisite state information and minimizes the number of dropped packets. Data messages originating from application DCNs (e.g., 563A) are forwarded to the primary service node according to the previous cluster membership (e.g., 541A) based on an entry in the forwarding table of the hypervisor until it is updated to reflect the new primary service node (e.g., 541D) and no data messages are dropped because of a lack of state information.

Figure 6:
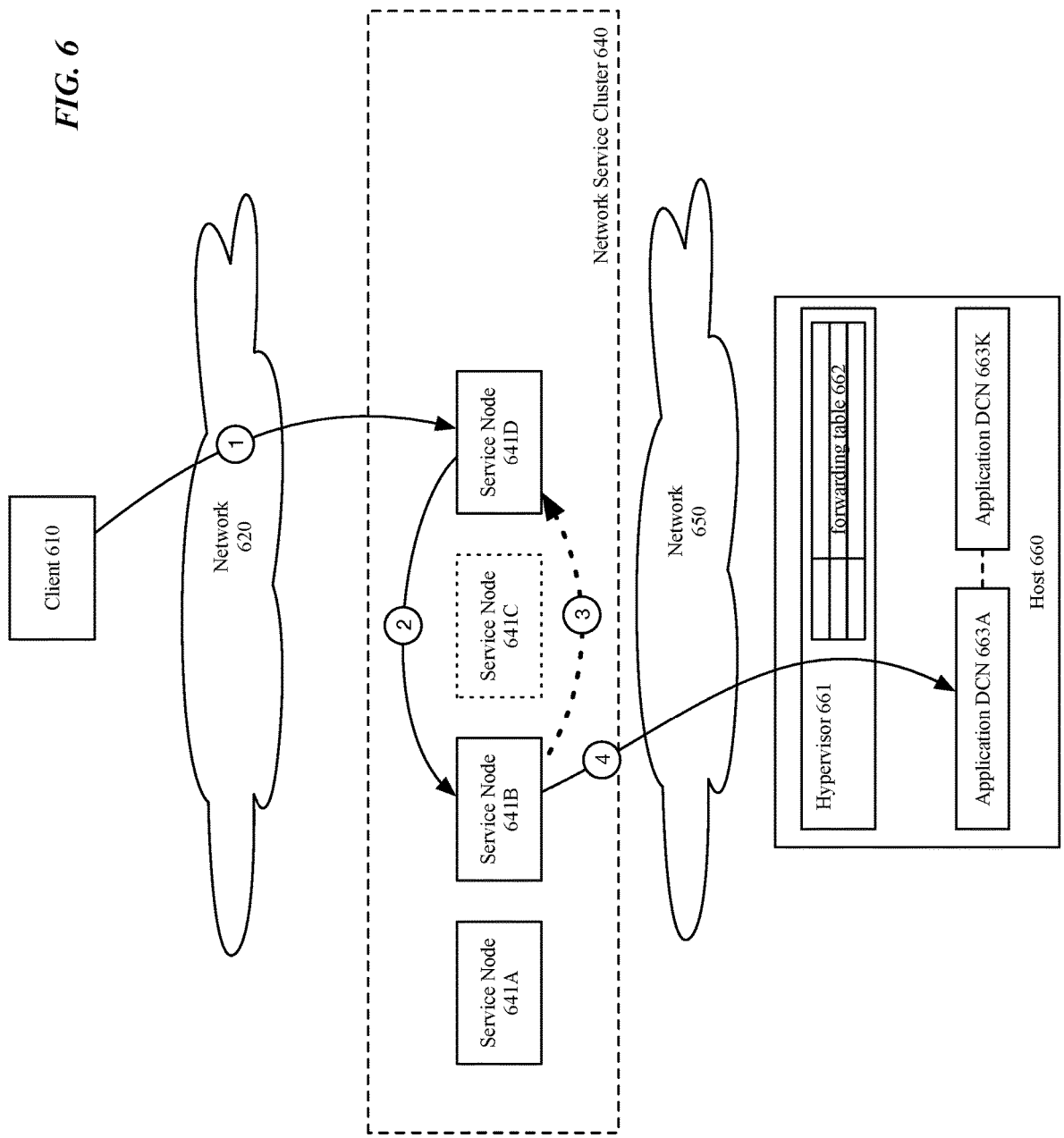
FIG. 6 conceptually illustrates a series of data messages in a data message flow exchanged when a service node that is neither a primary nor secondary service node for the data message flow is removed from a service node cluster.

FIG. 6 conceptually illustrates a series of data messages related to a data message flow after service node 641C, a service node that is neither a primary nor a secondary service node for the data message flow according to a previous network service cluster membership, is removed or fails. After detecting the failure of service node 641C, service node 641A identifies that service node 641B is a secondary service node according to both the previous and changed network service cluster membership and does not need to send state information to the secondary service node identified according to the changed network service cluster membership. In some embodiments, the secondary service node remains unchanged because the function used to identify the secondary service node is a consistent function (e.g., a consistent hash function).

After the cluster membership changes, client 610 sends data message 1 which, based on the new cluster membership is directed to service node 641D as the new primary service node based on a load balancing or ECMP function performed in network 620. Service node 641D receives the data message and, not having state information, identifies the secondary service node according to the previous cluster membership (641B) as the data message was received before a resynchronization time has elapsed since the last membership change. Service node 641D forwards the message to service node 641B as data message 2 for service node 641B to process (or redirect).

In response to receiving the data message from service node 641D, service node 641B sends, as data message 3, the state (or redirection) information for the data message flow to which the received data message belongs to service node 641D. Service node 641D can use state information received from service node 641B to process future data messages received for the data message flow and the data messages in both directions eventually flow exclusively through 641D until a change in membership disrupts the flow distribution. If the data message flow requires per-packet state information, the redirection information is used to redirect future data messages to primary service node 641A.

For data message flows requiring per-session state information, service node 641B processes the data message using the state information it stores as the secondary service node for the data message flow. Service node 641B then sends the processed data message as data message 4 to the destination DCN, application DCN 663A. However, for data message flows requiring per-packet state information, service node 641B forwards the data message to service node 641A for service node 641A to process and forward to the destination DCN, application DCN 663A (not shown). In such embodiments requiring per-packet state information, the data messages originating from application DCN 663 are directed to service node 641A without redirection based on the entry in the forwarding table in hypervisor 661.

Figure 7:
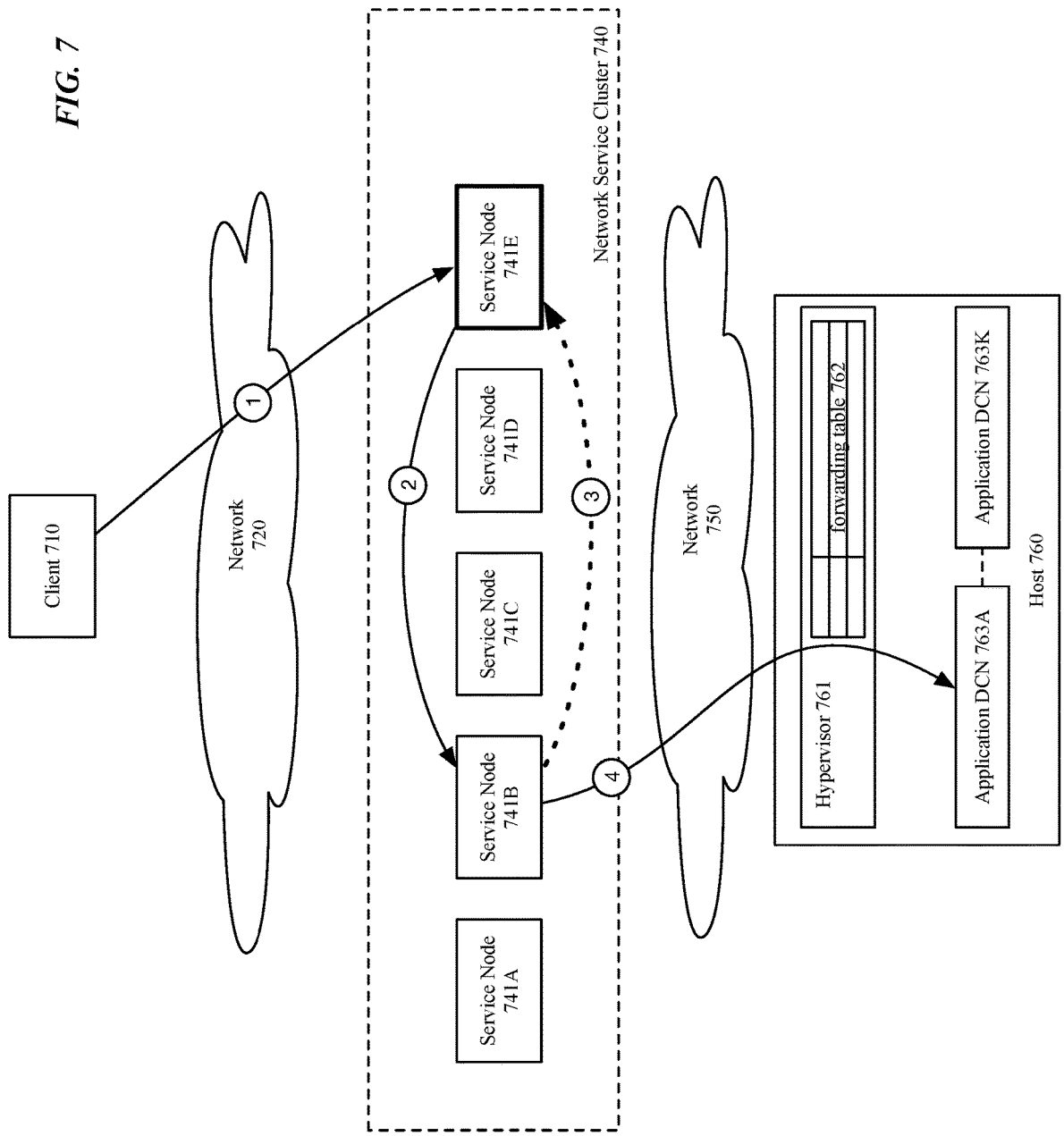
FIG. 7 conceptually illustrates a series of data messages in a data message flow exchanged when a service node is added to a service node cluster.

FIG. 7 conceptually illustrates a series of data messages related to a data message flow after service node 741E is added to the network service cluster. After detecting the addition of service node 741E, service node 741A identifies that service node 741B is a secondary service node according to both the previous and changed network service cluster membership and does not need to send state information to the secondary service node identified according to the changed network service cluster membership.

After the cluster membership changes, client 710 sends data message 1 which, based on the new cluster membership is directed to service node 741E as the new primary service node based on a load balancing or ECMP function performed in network 720. Service node 741E receives the data message and, not having state information, identifies the secondary service node according to the previous cluster membership (741B) as the data message was received before a resynchronization time has elapsed since the last membership change. Service node 741E forwards the message to service node 741B as data message 2 for service node 741B to process (or redirect).

In response to receiving the data message from service node 741E, service node 741B sends, as data message 3, the state (or redirection) information for the data message flow to which the received data message belongs to service node 741E. Service node 741E can use state information received from service node 741B to process future data messages received for the data message flow. If the data message flow requires per-packet state information, the redirection information is used to redirect future data messages to primary service node 741A.

For data message flows requiring per-session state information, service node 741B processes the data message using the state information it stores as the secondary service node for the data message flow. Service node 741B then sends the processed data message as data message 4 to the destination DCN, application DCN 763A. However, for data message flows requiring per-packet state information, service node 741B forwards the data message to service node 741A for service node 741A to process and forward to the destination DCN, application DCN 763A (not shown).

Figure 8:
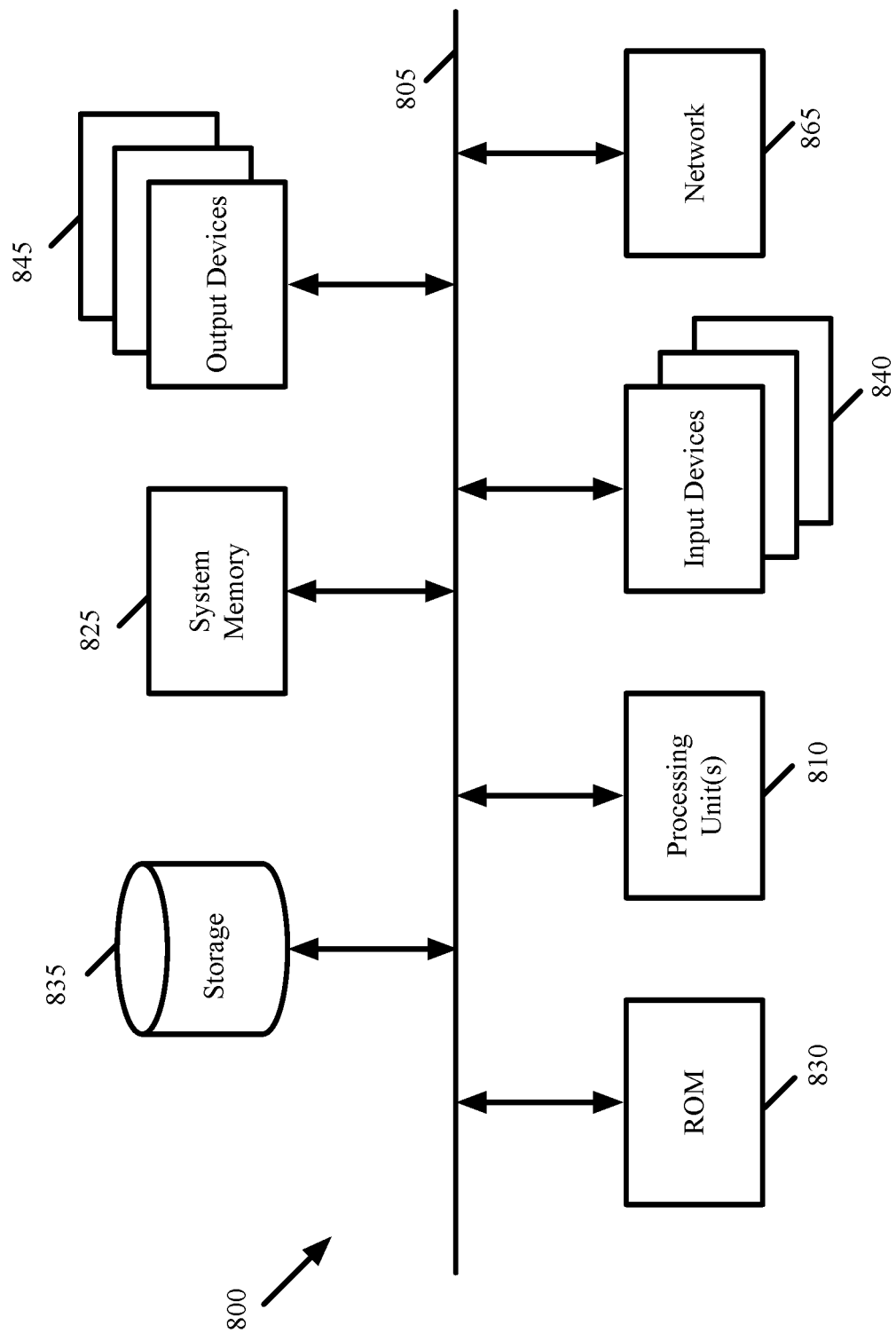
FIG. 8 conceptually illustrates an electronic system with which some embodiments of the invention are implemented.

FIG. 8 conceptually illustrates an electronic system 800 with which some embodiments of the invention are implemented. The electronic system 800 can be used to execute any of the control, virtualization, or operating system applications described above. The electronic system 800 may be a computer (e.g., a desktop computer, personal computer, tablet computer, server computer, mainframe, a blade computer etc.), phone, PDA, or any other sort of electronic device. Such an electronic system includes various types of computer readable media and interfaces for various other types of computer readable media. Electronic system 800 includes a bus 805, processing unit(s) 810, a system memory 825, a read-only memory 830, a permanent storage device 835, input devices 840, and output devices 845.

The bus 805 collectively represents all system, peripheral, and chipset buses that communicatively connect the numerous internal devices of the electronic system 800. For instance, the bus 805 communicatively connects the processing unit(s) 810 with the read-only memory 830, the system memory 825, and the permanent storage device 835.

From these various memory units, the processing unit(s) 810 retrieve instructions to execute and data to process in order to execute the processes of the invention. The processing unit(s) may be a single processor or a multi-core processor in different embodiments.

The read-only-memory (ROM) 830 stores static data and instructions that are needed by the processing unit(s) 810 and other modules of the electronic system. The permanent storage device 835, on the other hand, is a read-and-write memory device. This device is a non-volatile memory unit that stores instructions and data even when the electronic system 800 is off. Some embodiments of the invention use a mass-storage device (such as a magnetic or optical disk and its corresponding disk drive) as the permanent storage device 835.

Other embodiments use a removable storage device (such as a floppy disk, flash drive, etc.) as the permanent storage device. Like the permanent storage device 835, the system memory 825 is a read-and-write memory device. However, unlike storage device 835, the system memory is a volatile read-and-write memory, such as random access memory. The system memory stores some of the instructions and data that the processor needs at runtime. In some embodiments, the invention's processes are stored in the system memory 825, the permanent storage device 835, and/or the read-only memory 830. From these various memory units, the processing unit(s) 810 retrieve instructions to execute and data to process in order to execute the processes of some embodiments.

The bus 805 also connects to the input and output devices 840 and 845. The input devices enable the user to communicate information and select commands to the electronic system. The input devices 840 include alphanumeric keyboards and pointing devices (also called "cursor control devices"). The output devices 845 display images generated by the electronic system. The output devices include printers and display devices, such as cathode ray tubes (CRT) or liquid crystal displays (LCD). Some embodiments include devices such as a touchscreen that function as both input and output devices.

Finally, as shown in FIG. 8, bus 805 also couples electronic system 800 to a network 865 through a network adapter (not shown). In this manner, the computer can be a part of a network of computers (such as a local area network ("LAN"), a wide area network ("WAN"), or an Intranet, or a network of networks, such as the Internet. Any or all components of electronic system 800 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself.

As used in this specification, the terms "computer", "server", "processor", and "memory" all refer to electronic or other technological devices. These terms exclude people or groups of people. For the purposes of the specification, the terms display or displaying means displaying on an electronic device. As used in this specification, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

This specification refers throughout to computational and network environments that include virtual machines (VMs). However, virtual machines are merely one example of data compute nodes (DCNs) or data compute end nodes, also referred to as addressable nodes. DCNs may include non-virtualized physical hosts, virtual machines, containers that run on top of a host operating system without the need for a hypervisor or separate operating system, and hypervisor kernel network interface modules.

VMs, in some embodiments, operate with their own guest operating systems on a host machine using resources of the host machine virtualized by virtualization software (e.g., a hypervisor, virtual machine monitor, etc.). The tenant (i.e., the owner of the VM) can choose which applications to operate on top of the guest operating system. Some containers, on the other hand, are constructs that run on top of a host operating system without the need for a hypervisor or separate guest operating system. In some embodiments, the host operating system uses name spaces to isolate the containers from each other and therefore provides operating-system level segregation of the different groups of applications that operate within different containers. This segregation is akin to the VM segregation that is offered in hypervisor-virtualized environments that virtualize system hardware, and thus can be viewed as a form of virtualization that isolates different groups of applications that operate in different containers. Such containers are more lightweight than VMs.

Hypervisor kernel network interface modules, in some embodiments, is a non-VM DCN that includes a network stack with a hypervisor kernel network interface and receive/transmit threads. One example of a hypervisor kernel network interface module is the vmknic module that is part of the ESXi™ hypervisor of VMware, Inc.

It should be understood that while the specification refers to VMs, the examples given could be any type of DCNs, including physical hosts, VMs, non-VM containers, and hypervisor kernel network interface modules. In fact, the example networks could include combinations of different types of DCNs in some embodiments.

While the invention has been described with reference to numerous specific details, one of ordinary skill in the art will recognize that the invention can be embodied in other specific forms without departing from the spirit of the invention. In addition, a number of the figures (including FIGS. 1A-C and 3) conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process. Thus, one of ordinary skill in the art would understand that the invention is not to be limited by the foregoing illustrative details, but rather is to be defined by the appended claims.

We claim:

1. For a first service node in a cluster of service nodes in a first network that perform a service for data message flows between a second network and endpoints in the first network, a method comprising:
    at the first service node, receiving a data message for a particular data message flow for which the first service node does not maintain state information, the data message received from a forwarding element of the second network that selects between the service nodes of the cluster for data messages directed to the endpoints of the first network;
    identifying a second service node in the cluster of service nodes to perform the service for the received data message, wherein the second service node stores state information for the particular data message flow; and
    forwarding the data message to the second service node, wherein (i) the second service node performs the service for the data message and sends state information for the particular data message flow to the first service node and (ii) the first service node uses the state information from the second service node to perform the service for subsequent data messages in the particular data message flow without forwarding the subsequent data messages to the second service node.

2. The method of claim 1, wherein the second service node forwards the data message along with information identifying a primary service node for the data flow to a host computer on which a destination data compute node for the data message executes, wherein return data messages from the data compute node are forwarded to the primary service node using the information identifying the primary service node.

3. The method of claim 2, wherein the primary service node is the first service node.

4. The method of claim 1, wherein the data message is a first data message, the method further comprising:
at the first service node, receiving a second data message in the particular data message flow after the first service node receives the state information from the second service node;
performing the service for the second data message using the received state information; and
to a host computer on which a destination data compute node for the first and second data messages executes, forwarding the second data message along with information identifying the first service node as a primary service node for the host computer to use to forward return data messages.

5. The method of claim 4, wherein the host computer replaces an entry in a reverse forwarding table that identified another service node in the service node cluster as the primary service node for return data messages in the particular data message flow with a new entry that identifies the first service node as the primary service node to which return data messages in the particular data message flow are forwarded.

6. The method of claim 1, wherein the data message is a particular data message and a third service node in the service node cluster previously received a set of data messages in the particular data message flow, wherein the third service node maintained state information for the particular data message flow and performed the service for data messages in the particular data message flow.

7. The method of claim 6, wherein the third service node received the set of data messages based on a first membership of the service node cluster and the first service node received the particular data message based on a second, different membership of the service node cluster.

8. The method of claim 7, wherein identifying the second service node comprises identifying the second service node based on the first membership of the service node cluster, wherein the first membership of the service node cluster is an immediately previous membership to the second, different membership of the service node cluster.

9. The method of claim 7, wherein at least one of the second and third service nodes identifies a fourth service node in the service node cluster based on a consistent hash over the second, different service node cluster membership to which to replicate the state information for the particular data message flow.

10. The method of claim 1, wherein the forwarding element of the second network is a router that uses equal-cost multipath (ECMP) routing to select the first service node from the cluster of service nodes for the data message.

11. The method of claim 1, wherein the data message is a first data message belonging to the data message flow after a third service node that received prior data messages belonging to the data message flow has been removed from the cluster of service nodes.

12. A non-transitory machine readable medium storing a program for execution by a set of processing units of a first service node in a cluster of service nodes in a first network that perform a service for data message flows between a second network and endpoints in the first network, the program comprising sets of instructions for:
from a forwarding element of the second network that selects between the service nodes of the cluster for data messages directed to the endpoints of the first network, receiving a data message for a particular data message flow for which the first service node does not maintain state information;
identifying a second service node in the cluster of service nodes to perform the service for the received data message, wherein the second service node stores state information for the particular data message flow; and
forwarding the data message to the second service node, wherein (i) the second service node performs the service for the data message and sends state information for the particular data message flow to the first service node and (ii) the first service node uses the state information from the second service node to perform the service for subsequent data messages in the particular data message flow without forwarding the subsequent data messages to the second service node.

13. The non-transitory machine readable medium of claim 12, wherein the second service node forwards the data message along with information identifying a primary service node for the data flow to a host computer on which a destination data compute node for the data message executes, wherein return data messages from the data compute node are forwarded to the primary service node using the information identifying the primary service node.

14. The non-transitory machine readable medium of claim 13, wherein the primary service node is the first service node.

15. The non-transitory machine readable medium of claim 12, wherein the data message is a first data message, the program further comprising sets of instructions for:
receiving a second data message in the particular data message flow after the first service node receives the state information from the second service node;
performing the service for the second data message using the received state information; and
to a host computer on which a destination compute node for the first and second data messages executes, forwarding the second data message along with information identifying the first service node as a primary service node for the host computer to use to forward return data messages.

16. The non-transitory machine readable medium of claim 15, wherein the host computer replaces an entry in a reverse forwarding table that identified another service node in the service node cluster as the primary service node for return data messages in the particular data message flow with a new entry that identifies the first service node as the primary service node to which return data messages in the particular data message flow are forwarded.

17. The non-transitory machine readable medium of claim 12, wherein the data message is a particular data message and a third service node in the service node cluster previously received a set of data messages in the particular data message flow, wherein the third service node maintained state information for the particular data message flow and performed the service for data messages in the particular data message flow.

18. The non-transitory machine readable medium of claim 17, wherein the third service node received the set of data messages based on a first membership of the service node cluster and the first service node received the particular data message based on a second, different membership of the service node cluster.

19. The non-transitory machine readable medium of claim 18, wherein the set of instructions for identifying the second service node comprises a set of instructions for identifying the second service node based on the first membership of the service node cluster, wherein the first membership of the service node cluster is an immediately previous membership to the second, different membership of the service node cluster.

20. The non-transitory machine readable medium of claim 18, wherein at least one of the second and third service nodes identifies a fourth service node in the service node cluster based on a consistent hash over the second, different service node cluster membership to which to replicate the state information for the particular data message flow.

* * * * *